May 23, 1939.   T. K. BROCKETT   2,159,651
SAFETY CAR BUMPER APPARATUS
Filed June 27, 1938
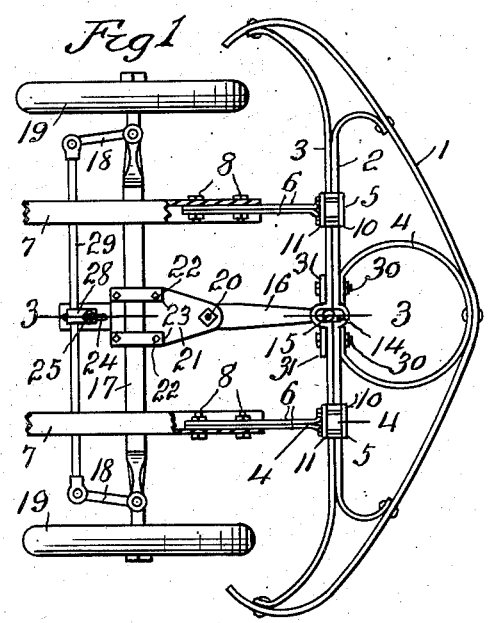
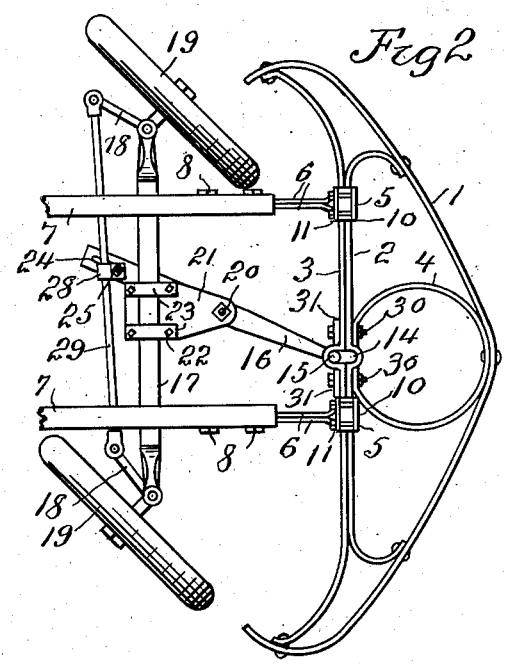
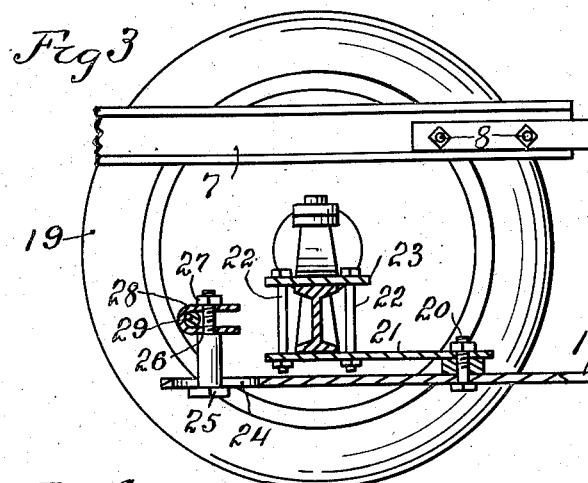
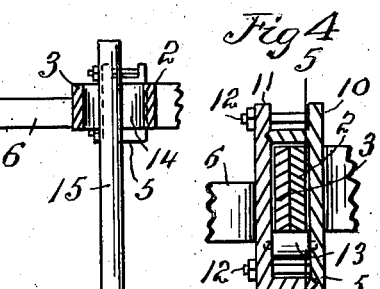
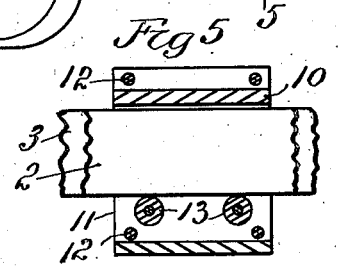
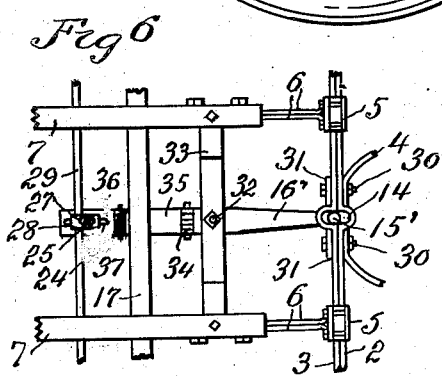
Inventor
Thomas K. Brockett
By Warren D. House
His Attorney Patented May 23, 1939

2,159,651

UNITED STATES PATENT OFFICE 2,159,651

SAFETY CAR BUMPER APPARATUS

Thomas K. Brockett, Iola, Kans.

Application June 27, 1938, Serial No. 216,078

9 Claims. (Cl. 293—55)

My invention relates to improvements in safety car bumper apparatus.

One of the objects of my invention is the provision of a novel car bumper apparatus of the kind described, which, when the front bumper is struck by an object at either side, and from the front, side, or coming from the rear, the bumper will be moved transversely toward the opposite side from which the blow was struck and the front wheels will be instantly toward said opposite side, so as to clear the car from the striking object.

A further object of my invention is the provision of a novel bumper apparatus which is simple, relatively cheap to make and to apply to any car now in use, which is strong, durable, not likely to be broken or to get out of order, and which is efficient in its operation.

The novel features of my invention are hereinafter fully described and claimed.

In the accompanying drawing, which illustrates my invention,

Fig. 1 is a plan view of one form of my improved bumper apparatus, shown mounted on the front portion of a car, with the wheels shown in the straight ahead position.

Fig. 2 is a view similar to Fig. 1, with the bumper shown moved transversely in one direction, and the front wheels shown turned in that direction.

Fig. 3 is an enlarged section on the line 3—3 of Fig. 1.

Fig. 4 is an enlarged section on the line 4—4 of Fig. 1.

Fig. 5 is an enlarged section on the line 5—5 of Fig. 4.

Fig. 6 is a plan view, partly broken away of a modification of my invention.

Similar characters of reference designate similar parts in the different views.

Referring to Figs. 1 to 5, 1 designates the front bar of my improved bumper, and 2 and 3 two transverse rear bars that are disposed side by side for most of their lengths, and have their ends fastened to the inner side of the front bar 1. A circular bar 4 is disposed at the centers of and fastened to and between the front bar 1 and the bar 2.

The bars 2 and 3 are disposed edge up in bearing means comprising two transversely alined bearings 5, each having at its rear end two rearwardly extending bars 6 disposed side by side.

The two pairs of bars 6 are respectively fastened longitudinally to the inner sides of two channel bars 7, by bolts 8, said channel bars being the longitudinal side beams of the car frame.

Each bearing 5, Figs. 4 and 5, comprises two right angled plates 10 and 11 fastened together by bolts 12 to form a rectangular housing through which the bumper bars 2 and 3 are transversely rectilinearly reciprocative on two rollers 13 having their front and rear ends respectively rotatably mounted in the plates 10 and 11 of the bearings 5.

The middle portion of the bars 2 and 3 have formed in them two oppositely facing recesses which register with each other and form a longitudinal slot 14 through which upwardly extends a vertical arm 15 of a right angle lever, the other arm 16 being horizontal and extending rearwardly under the car axle 17, to which are pivoted the steering knuckles 18 on which are mounted the front steering wheels 19 of the car.

The lever arm 16 has means pivotally connecting it with and supporting it by the axle 17. Such means for pivoting comprises a vertical bolt 20 extending through the lever arm 16 and the front end portion of a longitudinal plate 21, fastened to the under side of the axle 17 by bolts 22 extending through a plate 23 on top of the axle 17.

The rear end of the lever arm 16 has a longitudinal slot 24 through which extends a vertical bolt 25 having a shoulder 26, and threaded above the shoulder, and having a nut 27 on the threaded upper portion, Fig. 3.

A U shaped clamping plate 28 embraces and clampingly engages the middle portion of the steering connecting rod 29 attached in the usual manner to the knuckles 18, which with the rod 29 form part of the steering gear of the vehicle.

The arms of the clamping plate 28 have extending through them the threaded part of the bolt 25, the lower arm of the U shaped plate 28 resting on the shoulder 26, and the nut 27 bearing on top of the upper arm of the plate 28, whereby the bolt 25 securely clamps the plate 28 to the connecting steering rod 29, and is in turn firmly held in its operative position engaged with the rear end of the arm 16 of the lever.

For limiting the length of stroke of the reciprocative bumper, 1—2—3—4, there are fastened by bolts 30 to the rear side of the bar 3, at opposite sides respectively of the slot 14, two stop plates 31, Figs. 1 and 2, adapted to respectively engage the inner ends of the bearings 5, when the front wheels are swung to about the limit of their swinging capacity. An example of this is shown in Fig. 2.

Assuming that the left end of the bumper is struck by an object from the front, side or rear, the bumper will be moved to the right, as shown in Fig. 2, thereby swinging the arm 15 of the lever to the right and the rear end of the arm 16 of the lever to the left, thus shifting the connecting rod 29 to the left, and swinging the knuckles 18 and front steering wheels 19 to the positions shown in Fig. 2, thus steering the car away from the striking object. The reverse of this action takes place if the other end of the bumper is struck by an object.

In the form of my invention, shown in Fig. 6, the parts are as has been described, and as are shown in Figs. 1 to 5, with the following exceptions:—

The lever which shifts the steering connecting rod 29, instead of being pivotally connected to the axle, is pivotally connected to the car frame. The vertical arm 15' of the lever, corresponding to the arm 15, extends through the slot 14, and the rearwardly extending part 16' of the lever is pivoted by a vertical bolt 32 to the middle portion of a cross bar 33, the ends of which are upwardly and outwardly bent, the latter portions being respectively bolted to the car side beams 7.

The rear end of the part 16' of the lever is hinged on a transverse axis by a hinge 34 to the front end of a plate 35, the rear end of which is hinged on a transverse axis to the front end of a plate 36 by a hinge 37. The plate 36 corresponds to the rear end portion of the arm 16 of the lever shown in Fig. 3, and is connected to the connecting rod 29, in the same manner, that is by a clamping plate 28 embracing the connecting rod 29, and held attached thereto by a vertical bolt 25 extending through a longitudinal slot 24 in the plate 36, and having a nut 27 engaging the upper side of the clamping plate 28, as has been described with reference to the form of my invention shown in Fig. 3.

The operation of the form shown in Fig. 6, is similar to that of the other form of my invention.

The lower portion of the lever in this form of my invention is composed of three parts connected by the hinges 34 and 37, due to the pivoting of the lever to the frame, which moves vertically with respect to the axle 17 and the connecting rod 29, thereby requiring flexibility in the rearwardly extending portion of the lever.

When the bumper is moved transversely by an object striking it, the lever, comprising the parts 15', 16', plates 35 and 36 and hinges 34 and 37, will be swung by the bumper, and will thereby shift the connecting rod 29 by means of the clamping plate 28 and bolt 25, so as to swing the steering wheels 19 in the direction in which the bumper moves, thereby steering the car away from the striking object, in the manner already described with regard to the other form of my invention.

Other modifications of my invention, within the scope of the appended claims, may be made without departing from the spirit of my invention.

What I claim is:

1. The combination with a vehicle having front steering wheels and steering gear for swinging said wheels, of a bumper transversely rectilinearly movable on the front end of the vehicle, and means connecting the bumper with said steering gear by which, when the bumper is moved transversely rectilinearly on the vehicle in either direction, the steering gear will turn the front wheels in that direction.

2. The combination with a vehicle having front steering wheels and steering gear for swinging said wheels, of a bumper transversely rectilinearly movable on the front end of the vehicle, a lever pivoted to said bumper and to said vehicle, and means connecting said lever with said steering gear by which, when the bumper is moved transversely rectilinearly in either direction, the steering gear will be actuated to turn the front wheels in that direction.

3. The combination with a vehicle having front steering wheels and steering gear which includes a steering connecting rod, of a bumper transversely rectilinearly movable on the front end of the vehicle, a lever pivoted to the bumper and to the vehicle, and means connecting said lever with said connecting rod, by which, when said bumper moves transversely rectilinearly in either direction, said connecting rod will be actuated to turn the front wheels in that direction.

4. The combination with a vehicle having a frame, front steering wheels, and steering gear for swinging said wheels, of bearing means on the said frame, a bumper transversely rectilinearly movable on said bearing means, and means connecting said bumper with said steering gear by which, when said bumper is moved transversely rectilinearly on said bearing means in either direction, said steering gear will be actuated to turn said wheels in that direction.

5. The combination with a vehicle having a frame, front steering wheels, and steering gear for swinging said wheels, of two transversely alined spaced apart bearings mounted on the front end of said frame, a bumper rectilinearly reciprocative in said bearings, and means connecting said bumper with said steering gear by which, when said bumper moves transversely in either direction in said bearings, said steering gear will be actuated to turn said wheels in said direction.

6. The combination with a vehicle having a frame, front steering wheels, and steering gear for swinging said wheels, of bearing means on the front end of said frame, a bumper transversely rectilinearly reciprocative on said bearing means, a lever pivoted to said bumper and to said frame, and means connecting said lever with said steering gear by which, when said bumper is moved in either direction on said bearing means, said steering gear will be actuated to turn said wheels in that direction.

7. The combination with a vehicle having a frame, a front axle, front steering wheels, and steering gear for swinging said wheels, of bearing means on the front end of said frame, a bumper transversely rectilinearly reciprocative on said bearing means, a lever pivoted to said bumper, means pivotally supporting said lever on said axle, and means by which, when said bumper moves transversely on said bearing means in either direction, said steering gear will be actuated to turn said wheels in that direction.

8. The combination with a vehicle having a frame, a front axle, front steering wheels, and steering gear including a steering connecting rod, of two spaced apart transversely alined bearings on said frame, a bumper rectilinearly reciprocative on said bearings, a lever pivoted to said bumper, means pivoting said lever to said axle, and means connecting said lever with said connecting rod by which, when said bumper is moved transversely in either direction on said bearings, said connecting rod will be actuated to turn said wheels in said direction.

9. The combination with a vehicle having a frame provided with two longitudinal side beams, a front axle, front steering wheels, and steering gear including a steering connecting rod, of two spaced apart transversely alined bearings respectively mounted on the front ends of said side beams, a bumper rectilinearly reciprocative on said bearings, a lever pivoted to said bumper, means pivotally connecting said lever with said axle, and means connecting said lever with said connecting rod by which, when said bumper is moved transversely in either directions on said bearings, said connecting rod will be actuated to turn said wheels in that direction.

THOMAS K. BROCKETT.